United States Patent
Park et al.

(10) Patent No.: US 11,204,105 B2
(45) Date of Patent: Dec. 21, 2021

(54) SOLENOID VALVE

(71) Applicants: Hyundai Motor Company, Seoul (KR); Kia Motors Corporation, Seoul (KR)

(72) Inventors: In Tae Park, Gyeonggi-do (KR); Hyeon Seok Ban, Gyeonggi-Do (KR); Hyo Sub Shim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/034,763

(22) Filed: Sep. 28, 2020

(65) Prior Publication Data
US 2021/0285564 A1   Sep. 16, 2021

(30) Foreign Application Priority Data
Mar. 16, 2020   (KR) .......................... 10-2020-0032210

(51) Int. Cl.
  *F16K 31/06*  (2006.01)
  *F16K 1/36*  (2006.01)
(52) U.S. Cl.
  CPC ............ *F16K 31/0658* (2013.01); *F16K 1/36* (2013.01); *F16K 31/0651* (2013.01)

(58) Field of Classification Search
CPC ..... F16K 1/36; F16K 31/0651; F16K 31/0658
See application file for complete search history.

(56) References Cited

U.S. PATENT DOCUMENTS 2,616,452 A * 11/1952 Clay .................. F16K 31/0651
                                                            251/129.21

* cited by examiner

*Primary Examiner* — Eric Keasel
(74) *Attorney, Agent, or Firm* — Mintz Levin Cohn Ferris Glovsky and Popeo, P.C.; Peter F. Corless

(57) ABSTRACT

A solenoid valve includes a valve housing having a first space that communicates with an inlet flow path and a second space that communicates with an outlet flow path. A solenoid is provided in the valve housing to surround the first space. A flow path guide is provided in the first space and has an inflow path communicating with the first space. A plunger is rectilinearly moved in the flow path guide by the solenoid. A valve member is connected to the plunger and opens or closes the outlet flow path based on a plunger movement. A spring member provides elastic force allowing the valve member to move in a direction in which the valve member blocks the outlet flow path. A fluid guide part is formed in the plunger and guides a fluid, supplied into the inflow path via the first space, selectively to the second space.

11 Claims, 8 Drawing Sheets

SOLENOID VALVE

CROSS-REFERENCE TO RELATED APPLICATIONS

This application claims priority to and the benefit of Korean Patent Application No. 10-2020-0032210 filed on Mar. 16, 2020, the entire contents of which are incorporated herein by reference.

TECHNICAL FIELD

The present disclosure relates to a solenoid valve, and more particularly, to a solenoid valve capable of improving stability and reliability.

BACKGROUND ART

A solenoid valve may be used to regulate a flow of a fluid or control a pressure. For example, a solenoid valve may be installed in a power train including an engine of a vehicle and serve to regulate a flow of a fluid such as fuel or oil or control a pressure. More specifically, a solenoid valve mounted in a fuel system may control an operation of supplying and injecting fuel, a solenoid valve mounted in a cooling system may control circulation for lubrication and cooling, and a solenoid valve mounted in a power transmission system may adjust a pressure.

In general, the solenoid valve includes a solenoid configured to provide driving power, a valve member configured to open or close an outlet flow path by being operated by the solenoid, and a spring member configured to elastically support a movement of the valve member. In addition, recently, there has been proposed a method of allowing leakproof sealability (e.g., a blocked state of the outlet flow path), which is made by the valve member, to be maintained by both elastic force of the spring member and a pressure of the fluid by applying the elastic force of the spring member to the valve member and applying the pressure of the fluid supplied into the solenoid valve to the valve member (e.g., applying the pressure to cause the valve member to move in a direction in which the valve member blocks the outlet flow path).

However, in the related art, during a process of initially opening the valve member (e.g., switching from a closed state of the valve member to an opened state of the valve member), the fluid, which presses a rear portion of the valve member to block the outlet flow path, rapidly flows into a front portion of the valve member, and thus the pressure changes (e.g., the pressure in the front portion of the valve member increases), which causes a difficulty to accurately control a movement stroke of the valve member and accuracy of proportional control for the valve member deteriorates.

Therefore, recently, various types of research is being conducted to ensure leakproof sealability of the solenoid valve and improve stability of proportional control, but the research result is still insufficient. Accordingly, there is a need for development of a solenoid valve capable of ensuring leakproof sealability and improving stability of proportional control.

SUMMARY

The present disclosure provides a solenoid valve capable of improving stability and reliability. The present disclosure has also been made in an effort to ensure leakproof sealability of a solenoid valve, improve accuracy of proportional control, and prevent an abnormal operation of a valve member from being caused by a rapid change in pressure during a process of initially opening the solenoid valve. The object to be achieved by the exemplary embodiment is not limited to the above-mentioned objects, but also includes objects or effects that may be recognized from the solutions or the exemplary embodiments described below.

In order to achieve the objects of the present disclosure, an exemplary embodiment of the present disclosure provides a solenoid valve that may include: a valve housing having, at a first side, a first space that communicates with an inlet flow path and having, at a second side, a second space that communicates with an outlet flow path; a solenoid provided in the valve housing to surround the first space; a flow path guide provided in the first space and having an inflow path that communicates with the first space; a plunger configured to be rectilinearly moved in the flow path guide by the solenoid; a valve member connected to the plunger and configured to open or close the outlet flow path in accordance with a movement of the plunger; a spring member configured to provide elastic force to allow the valve member to move in a direction in which the valve member blocks the outlet flow path; and a fluid guide part formed in the plunger and configured to guide a fluid, which is supplied into the inflow path via the first space, selectively to the second space.

Accordingly, leakproof sealability of the solenoid valve may be ensured and an abnormal operation of the valve member may be prevented from being caused by a rapid change in pressure when the solenoid valve is initially opened. In other words, in the related art, leakproof sealability achieved by the valve member (e.g., the blocked state of the outlet flow path) may be maintained due to both the elastic force of the spring member and the pressure of the fluid are applied to the valve member.

However, during a process of initially opening the valve member (e.g., switching from a closed state of the valve member to an opened state of the valve member), the fluid, which presses a rear portion of the valve member to block the outlet flow path, rapidly flows into a front portion of the valve member, and thus the pressure changes (e.g., the pressure in the front portion of the valve member increases), which causes difficulty in accurately controlling a movement stroke of the valve member and accuracy of proportional control for the valve member deteriorates.

In contrast, according to the exemplary embodiment of the present disclosure, the fluid supplied into the first space does not always flow into the second space in which the valve member is disposed, but the fluid selectively flows into the second space based on the movement of the plunger. As a result, it may be possible to obtain an advantageous effect of minimizing an abnormal operation of the valve member caused by a rapid change in pressure in the second space while the valve member opens the outlet flow path. It may also be possible to obtain an advantageous effect of improving stability and reliability and improving control accuracy.

Among others, according to the exemplary embodiment of the present disclosure, it may be possible to prevent an abnormal operation of the valve member from being caused by a rapid change in pressure in the second space when the solenoid valve is initially opened (e.g., while the valve member moves from a first position at which the outlet flow path is blocked to a second position at which the outlet flow path is opened to a predetermined initial open section), and as a result, it may be possible to obtain an advantageous effect of improving accuracy of proportional control for the valve member.

Further, according to the exemplary embodiment of the present disclosure, both the elastic force made by the spring member and the pressure of the fluid supplied into the solenoid valve may be applied to the valve member, and as a result, it may be possible to obtain an advantageous effect of stably maintaining a state in which the outlet flow path is blocked by the valve member It may also be possible to obtain an advantageous effect of improving leakproof sealability.

According to the exemplary embodiment of the present disclosure, the flow path guide may have an inflow chamber formed in the first space, and the inflow chamber may be spatially separated from the first space. The inflow path, which allows the first space and the inflow chamber to communicate with each other, may be formed in a sidewall portion of the flow path guide.

A plurality of inflow paths may be formed to be spaced apart from one another in a circumferential direction of the flow path guide. Since the plurality of inflow paths may be formed to be spaced apart in the circumferential direction of the flow path guide as described above, the fluid introduced into the first space may be supplied into the inflow chamber uniformly in the circumferential direction of the flow path guide, and as a result, it may be possible to obtain an advantageous effect of improving stability and efficiency in supplying the fluid.

According to the exemplary embodiment of the present disclosure, a sealing member may be provided at a lower end of the valve member to elastically come into contact with the outlet flow path. Since the sealing member is provided at the lower end of the valve member as described above, it may be possible to obtain an advantageous effect of improving leakproof sealability made by the valve member.

The fluid guide part may have various structures capable of guiding the fluid, which is supplied into the first space, selectively to the second space in accordance with the movement of the plunger. According to the exemplary embodiment of the present disclosure, the fluid guide part may include: a first guide flow path formed in the plunger and disposed to selectively communicate with the inflow path in accordance with the movement of the plunger; and a second guide flow path having a first end that communicates with the first guide flow path, and a second end that is exposed to the second space.

A state in which the first guide flow path does not communicate with the inflow path may be maintained while the valve member moves from a first position at which the outlet flow path is blocked to a second position at which the outlet flow path is opened to a predetermined initial open section. In the exemplary embodiment of the present disclosure as described above, the state in which the first guide flow path and the inflow path do not communicate with each other may be maintained while the solenoid valve is initially opened (e.g., while the valve member moves from the first position at which the outlet flow path is blocked to the second position at which the outlet flow path is opened to the predetermined initial open section). As a result, it may be possible to prevent an abnormal operation of the valve member from being caused by a rapid change in pressure in the second space, thereby obtaining an advantageous effect of improving accuracy of proportional control for the valve member.

A plurality of first guide flow paths may be provided to be spaced apart from one another in the circumferential direction of the plunger The structure of the second guide flow path may be variously changed based on required conditions and design specifications. As an example, the second guide flow path may include: a first flow path configured to communicate with the first guide flow path and formed along the interior of the plunger; and a second flow path having a first end that communicates with the first flow path, and a second end that is exposed to the second space.

A plurality of second flow paths may be provided to be spaced apart from one another in the circumferential direction of the plunger. Since the plurality of second flow paths may be formed to be spaced apart from one another in the circumferential direction of the plunger as described above, the fluid supplied along the first flow path may be supplied into the second space uniformly in the circumferential direction of the plunger, and as a result, it may be possible to obtain an advantageous effect of uniformly forming the pressure in the second space as a whole.

The plurality of first guide flow paths may be connected in common to a first end of the first flow path, and the plurality of second flow paths may be connected in common to a second end of the first flow path. Since the plurality of first guide flow paths may be connected in common to the first end of the first flow path and the plurality of second flow paths may be connected in common to the second end of the first flow path as described above, only the single first flow path is needed to connect the plurality of first guide flow paths and the plurality of second flow paths, and as a result, it may be possible to obtain an advantageous effect of simplifying a structure and a manufacturing process. According to another exemplary embodiment of the present disclosure, the plurality of first guide flow paths and the plurality of second flow paths may be connected by a plurality of first flow paths different from each other.

In addition, according to the exemplary embodiment of the present disclosure, the spring support part may have a aperture that communicates with the fluid guide part and the second space. As described above, since the aperture is formed in the spring support part and the fluid, which is guided to the second guide flow path through the first guide flow path, is supplied into the second space through the aperture, it is possible to obtain an advantageous effect of minimizing a load while the outlet flow path is opened It may also be possible to obtain an advantageous effect of improving efficiency in discharging the fluid.

In addition, according to the exemplary embodiment of the present disclosure, a gap may be formed between the yoke and the plunger. The gap may have a smaller cross-sectional area than the fluid guide part. Since the gap has a smaller cross-sectional area than the fluid guide part as described above, a flow rate of the fluid flowing (leaking) through the gap may be much lower than a flow rate of the fluid flowing through the fluid guide part, such that an instantaneous change in pressure, which is caused by the fluid leaking from the first space to the second space through the gap when the solenoid valve is initially opened, may be negligibly low.

Therefore, it may be possible to obtain an advantageous effect of preventing an abnormal operation of the valve member from being caused by a rapid change in pressure of the second space when the solenoid valve is initially opened. It may also be possible to obtain an advantageous effect of improving accuracy of proportional control. The solenoid may have various structures capable of providing driving power for operating the plunger.

According to the exemplary embodiment of the present disclosure, the solenoid may include: a bobbin provided in the valve housing to surround the plunger; a coil wound around the bobbin; and a yoke disposed between the bobbin and the plunger. The solenoid valve may include the spring support part that extends from the yoke and configured to support the spring member. Since the spring support part is formed to extend from a part (e.g., a lower portion) of the yoke as described above, it may be possible to obtain an advantageous effect of simplifying the structure for supporting the spring member, and an advantageous effect of improving spatial utilization.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
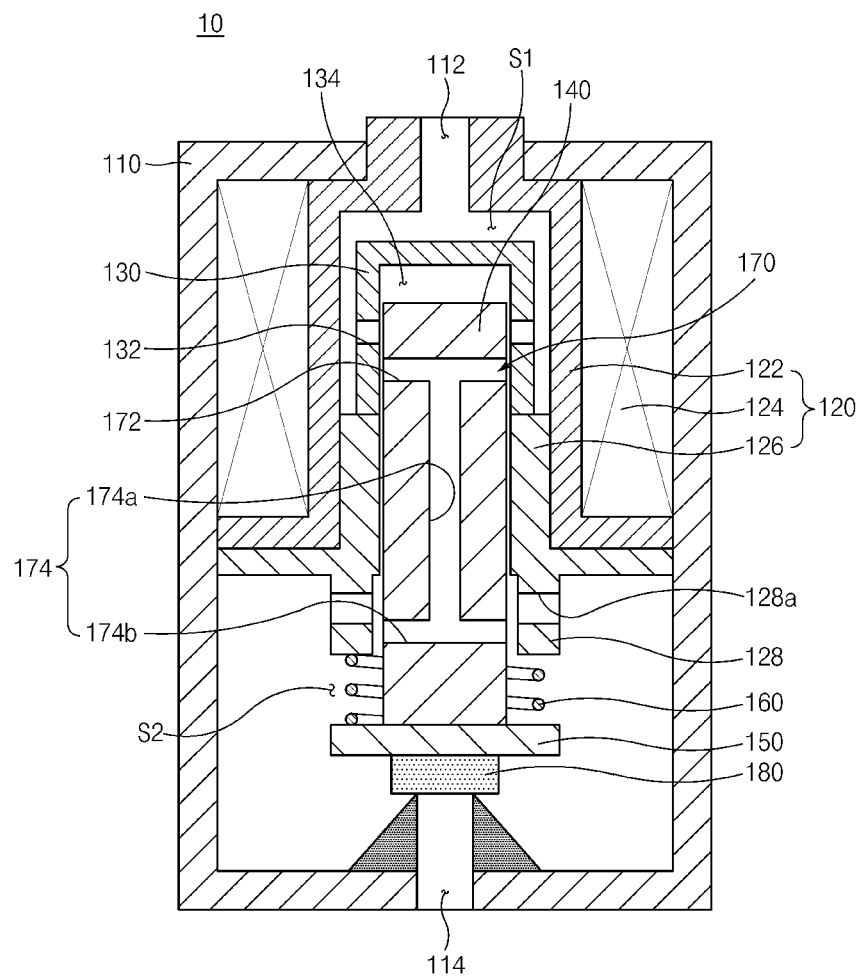
FIG. 1 is a view illustrating a solenoid valve according to an exemplary embodiment of the present disclosure.
Figure 2:
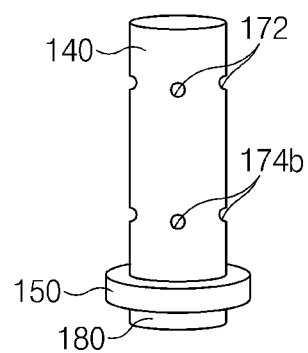
FIG. 2 is a perspective view illustrating a plunger of the solenoid valve according to the exemplary embodiment of the present disclosure.
Figure 3:
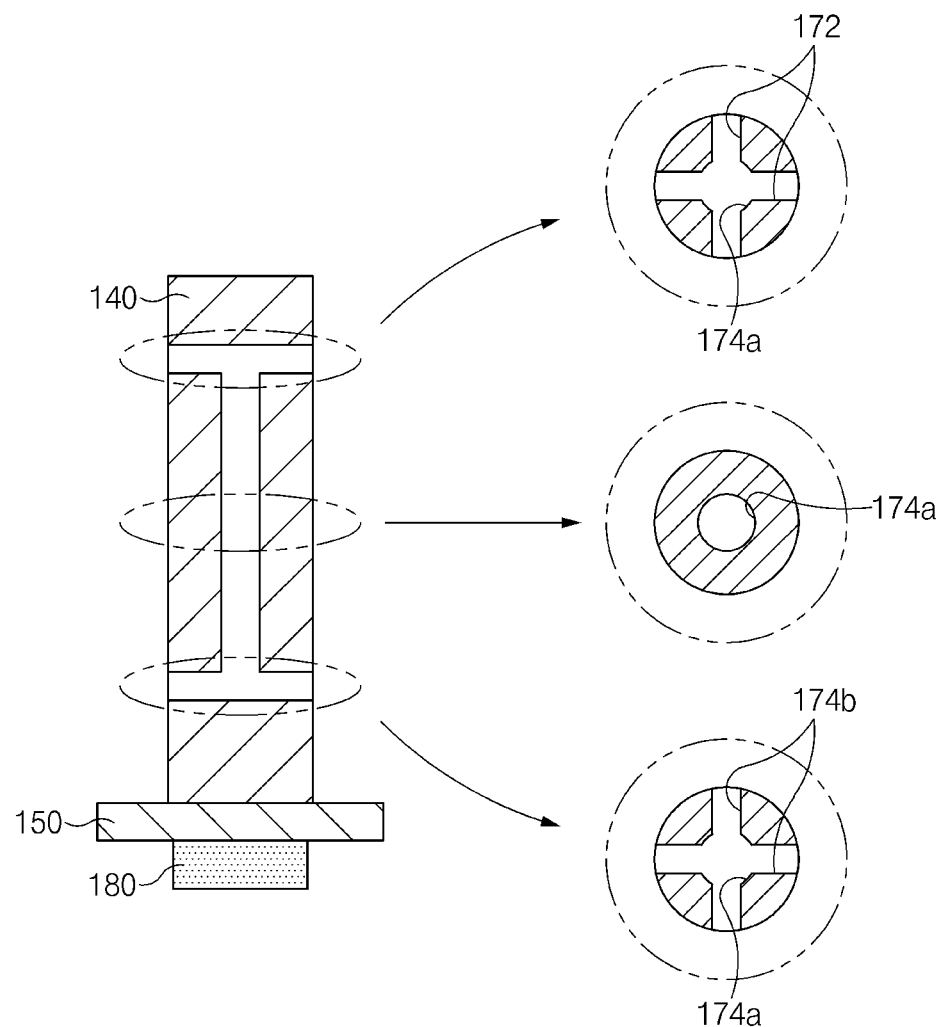
FIG. 3 is a cross-sectional view illustrating the plunger of the solenoid valve according to the exemplary embodiment of the present disclosure.
Figure 4:
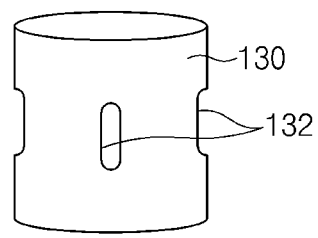
FIG. 4 is a perspective view illustrating a flow path guide of the solenoid valve according to the exemplary embodiment of the present disclosure.
Figure 5:
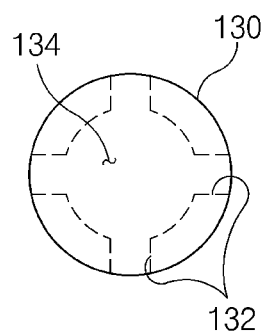
FIG. 5 is a cross-sectional view illustrating the flow path guide of the solenoid valve according to the exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. However, the technical spirit of the present disclosure is not limited to some exemplary embodiments described herein but may be implemented in various different forms. One or more of the constituent elements in the exemplary embodiments may be selectively combined and substituted within the scope of the technical spirit of the present disclosure.

In addition, unless otherwise specifically and explicitly defined and stated, the terms (including technical and scientific terms) used in the exemplary embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the exemplary embodiment of the present disclosure are for explaining the exemplary embodiments, not for limiting the present disclosure. Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the exemplary embodiments of the present disclosure. These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween. In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "up (above) or down (below)" may include a meaning of a downward direction as well as an upward direction based on one constituent element.

Referring to FIGS. 1 to 8, a solenoid valve 10 according to an exemplary embodiment of the present disclosure may include: a valve housing 110 having, at a first side, a first space S1 that communicates with an inlet flow path 112 and having, at a second side, a second space S2 that communicates with an outlet flow path 114; a solenoid 120 provided in the valve housing 110 to surround the first space S1; a flow path guide 130 provided in the first space S1 and having an inflow path 132 that communicates with the first space S1; a plunger 140 configured to be rectilinearly moved in the flow path guide 130 by the solenoid 120; a valve member 150 connected to the plunger 140 and configured to open or close the outlet flow path 114 based on a movement of the plunger 140; a spring member 160 configured to provide elastic force to allow the valve member 150 to move in a direction in which the valve member 150 blocks the outlet flow path 114; and a fluid guide part 170 formed in the plunger 140 and configured to guide a fluid, which is supplied into the inflow path 132 via the first space S1, selectively to the second space S2.

For reference, the solenoid valve 10 according to the exemplary embodiment of the present disclosure may be mounted in various objects in order to regulate a flow of a fluid or control a pressure, and the present disclosure is not limited or restricted by types and properties of objects in which the solenoid valve 10 is mounted. As an example, the solenoid valve 10 according to the exemplary embodiment of the present disclosure may be installed in a power train including an engine of a vehicle and serve to regulate a flow of a fluid such as fuel or oil or adjust a pressure. More specifically, the solenoid valve may be mounted in a fuel system to control an operation of supplying and injecting fuel, mounted in a cooling system to control circulation for lubrication and cooling, or mounted in a power transmission system to control a pressure.

The inlet flow path 112, through which the fluid is supplied (introduced), may be formed at a first side of the valve housing 110, and the outlet flow path 114, through which the fluid is discharged, is formed at a second side of the valve housing 110. In the valve housing 110, the first space S1 may be provided to communicate with the inlet flow path 112, and the second space S2 may be provided to communicate with the outlet flow path 114.

As an example, the inlet flow path 112 and the first space S1 configured to communicate with the inlet flow path 112 may be provided at an upper side of the valve housing 110 (based on FIG. 1), and the outlet flow path 114 and the second space S2 configured to communicate with the outlet flow path 114 may be provided at a lower side of the valve housing 110 (based on FIG. 1). According to another exemplary embodiment of the present disclosure, the inlet flow path 112 (or the outlet flow path) may be provided at a left side of the valve housing 110, and the outlet flow path 114 (or the inlet flow path) may be provided at a right side of the valve housing 110.

Figure 7:
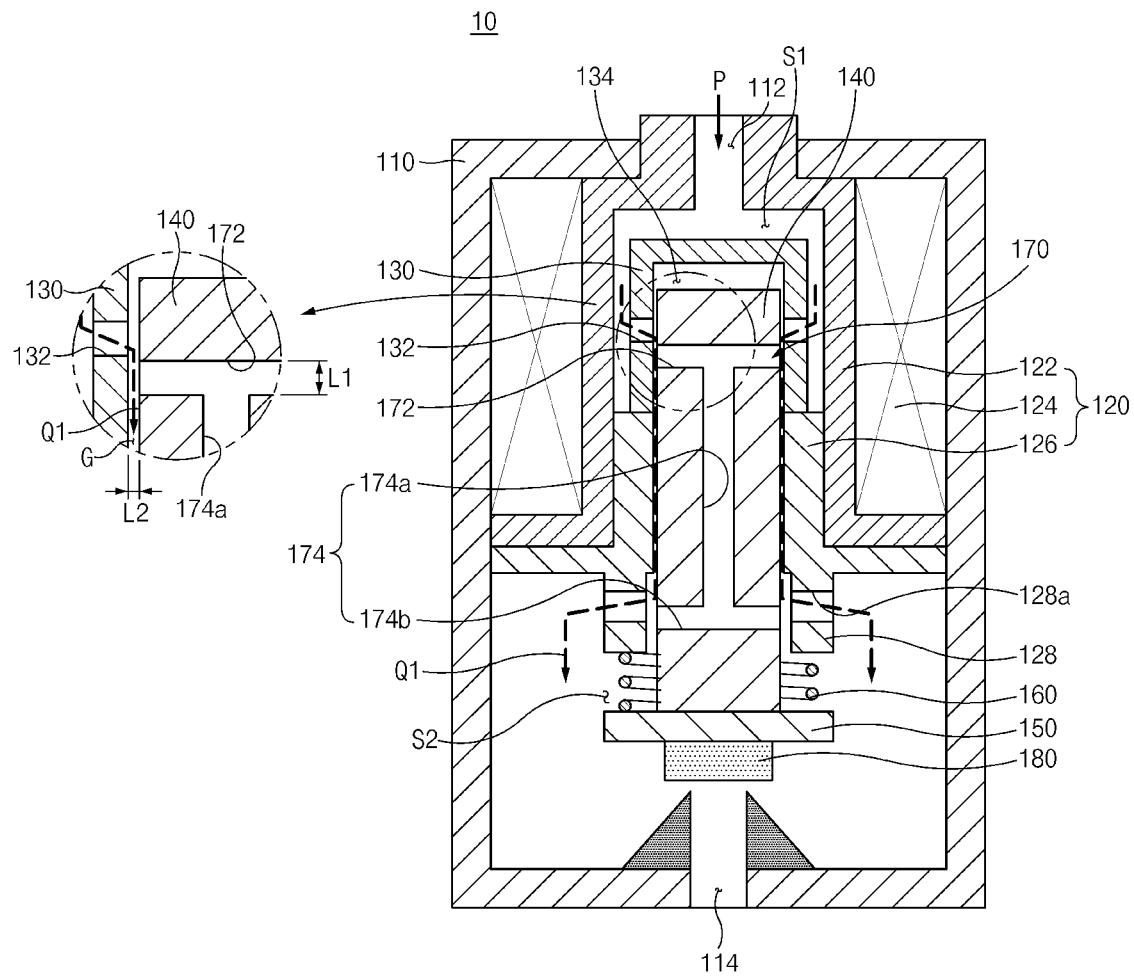
FIG. 7 is a view illustrating an initially opened state of the outlet flow path of the solenoid valve according to the exemplary embodiment of the present disclosure.

For reference, in the present disclosure, the first space S1 and the second space S2 may be the spaces spatially and completely separated (sealed) from each other or the spaces that communicate with each other through a fine gap (e.g., a gap G in FIG. 7). In particular, even though the first space S1 and the second space S2 communicate with each other through the fine gap G, an instantaneous change in pressure, which is caused by the fluid flowing through the gap G (e.g., the fluid in the first space S1 flowing to the second space S2 through the gap G), may be minimal or negligible.

The solenoid 120 may be configured to provide driving power for operating the plunger 140 (e.g., for moving the plunger 140 upward or downward) and disposed in the valve housing 110 to surround the first space S1. The solenoid 120 may have various structures capable of providing driving power for operating the plunger 140, and the present disclosure is not limited or restricted by the type and the structure of the solenoid 120.

As an example, the solenoid 120 may include a bobbin 122 provided in the valve housing 110 to surround the plunger 140, a coil 124 wound around the bobbin 122, and a yoke 126 disposed between the bobbin 122 and the plunger 140. The bobbin 122 may have a hollow cylindrical shape and may be disposed at the upper side in the valve housing 110. The first space S1, which communicates with the inlet flow path 112, may be disposed in the bobbin 122.

The coil 124 may be wound to surround the bobbin 122 and supplied with power from a power supply unit (not illustrated). The yoke 126 may be disposed at a lower side of the bobbin 122 to cover a part of an inner circumferential surface of the bobbin 122, and the plunger 140 may be received in the yoke 126 to be rectilinearly movable. For reference, in the exemplary embodiment of the present disclosure, the first space S1 may be defined as a space provided in the bobbin 122 and disposed above the yoke 126 and the plunger 140, and the second space S2 may be defined as a space provided in the valve housing 110 and disposed below the yoke 126 and the plunger 140.

The flow path guide 130 may be provided in the first space S1. The flow path guide 130, together with the fluid guide part 170, may supply the fluid, which is introduced into the first space S1 through the inlet flow path 112, selectively to the second space S2. The structure and the arrangement of the flow path guide 130 may be variously changed based on required conditions and design specifications.

As an example, the flow path guide 130 may have a hollow drum shape opened at a lower side thereof (based on FIG. 1). The flow path guide 130 may be disposed in the first space S1 to be supported at an upper end of the yoke 126. According to another exemplary embodiment of the present disclosure, the flow path guide 130 may be supported directly (e.g., by interference fit) on an inner wall of the bobbin 122. More specifically, referring to FIGS. 4 and 5, the flow path guide 130 may include an inflow chamber 134 formed in the first space S1, and the inflow chamber 134 may be spatially separated from the first space S1. The inflow path 132, which allows the first space S1 and the inflow chamber 134 to communicate with each other, may be formed in a sidewall portion of the flow path guide 130.

In particular, a plurality of inflow paths 132 may be formed to be spaced apart from one another in a circumferential direction of the flow path guide 130. As an example, four inflow paths 132 may be formed in the sidewall portion of the flow path guide 130 to be spaced apart from one another at an interval of about 90 degrees. In some instances, the flow path guide 130 may have three or less, or five or more inflow paths 132.

Since the plurality of inflow paths 132 may be formed to be spaced apart from one another in the circumferential direction of the flow path guide 130 as described above, the fluid introduced into the first space S1 may be supplied into the inflow chamber 134 uniformly in the circumferential direction of the flow path guide 130, and as a result, it may be possible to obtain an advantageous effect of improving stability and efficiency in supplying the fluid.

The plunger 140 may be provided to be rectilinearly moved in the flow path guide 130 by the solenoid 120. More specifically, the plunger 140 may be movable vertically in the bobbin 122 (yoke) and rectilinearly moved upward or downward in the bobbin 122 (in the yoke 126) by magnetic force generated when an electric current is applied to the coil 124. An upper end of the plunger 140 may be movably received in the flow path guide 130, and a lower end of the plunger 140 may be exposed to the second space S2.

For reference, the movement (stroke) of the plunger 140 relative to the bobbin 122 may be controlled by adjusting a value of the electric current to be applied to the coil 124. A flow rate and a pressure of the fluid flowing through the solenoid valve may be proportionally controlled (by proportional control) by adjusting the movement of the plunger 140 and thus adjusting a degree (e.g., an opening degree) to which the outlet flow path 114 is opened or closed by the valve member 150. Since the exemplary embodiment of the solenoid valve according to the present disclosure may include the bobbin 122 and the plunger 140 according to the well-known technology having the aforementioned configuration and operational principle, a detailed description thereof will be omitted.

The valve member 150 may be connected to the plunger 140 and provided to open or close the outlet flow path 114 based on the movement of the plunger 140. As an example, the valve member 150 may be integrally connected to the lower end of the plunger 140. When the plunger 140 moves upward, the valve member 150 moves upward together with the plunger 140, and thus, the outlet flow path 114 may be opened. In contrast, when the plunger 140 moves downward, the valve member 150 moves downward together with the plunger 140, and thus, the outlet flow path 114 may be blocked (closed).

The valve member 150 may have various structures capable of opening or closing the outlet flow path 114, and the present disclosure is not limited or restricted by the structure and the shape of the valve member 150. In particular, a sealing member 180 (e.g., made of rubber or silicone) may be provided at a lower end of the valve member 150 to elastically come into contact with the outlet flow path 114. Since the sealing member 180 may be provided at the lower end of the valve member 150 as described above, it may be possible to obtain an advantageous effect of improving leakproof sealability made by the valve member 150.

The spring member 160 may provide elastic force to allow the valve member 150 to move in the direction in which the valve member 150 blocks the outlet flow path 114. As an example, a typical spring (e.g., a coil spring) capable of elastically supporting the movement of the valve member 150 may be used as the spring member 160, and the present disclosure is not limited or restricted by the type and the structure of the spring member 160.

In particular, a spring support part 128 may extend from a lower portion of the yoke 126, and the spring member 160 may be disposed to be elastically compressed and restored between the spring support part 128 and the valve member 150. Since the spring support part 128 may be formed to extend from the lower portion of the yoke 126 as described above, it may be possible to obtain an advantageous effect of simplifying the structure for supporting the spring member 160 and improving spatial utilization. In some instances, a separate support portion for supporting the spring member 160 may be formed on an inner wall of the valve housing 110. The fluid guide part 170 may be provided to guide the fluid, which is supplied into the first space S1, selectively to the second space S2.

As described above, according to the exemplary embodiment of the present disclosure, the fluid supplied into the first space S1 does not always flow into the second space S2 in which the valve member 150 is disposed, but the fluid selectively flows into the second space S2 in accordance with the movement of the plunger 140. As a result, it may be possible to obtain an advantageous effect of minimizing an abnormal operation of the valve member 150 caused by a rapid change in pressure in the second space S2 while the valve member 150 opens the outlet flow path It may also be possible to obtain an advantageous effect of improving stability and reliability and improving control accuracy.

Further, according to the exemplary embodiment of the present disclosure, both the elastic force made by the spring member 160 and the pressure of the fluid supplied into the solenoid valve are applied to the valve member 150, and as a result, it may be possible to obtain an advantageous effect of stably maintaining a state in which the outlet flow path 114 is blocked by the valve member 150. It may also be possible to obtain an advantageous effect of improving leakproof sealability.

The fluid guide part 170 may have various structures capable of guiding the fluid, which is supplied into the first space S1, selectively to the second space S2 based on the movement of the plunger 140. As an example, referring to FIGS. 2 and 3, the fluid guide part 170 may include a first guide flow path 172 formed in the plunger 140 and disposed to selectively communicate with the inflow path 132 based on the movement of the plunger 140, and a second guide flow path 174 having a first end that communicates with the first guide flow path 172, and a second end that is exposed to the second space S2.

In particular, the first guide flow path 172 may be formed to be maintained in a state in which the first guide flow path 172 does not communicate with the inflow path 132 while the valve member 150 moves from a first position (see FIG. 6) at which the outlet flow path 114 is blocked to a second position (see FIG. 7) at which the outlet flow path 114 is opened to a predetermined initial open section.

In the exemplary embodiment of the present disclosure as described above, the state in which the first guide flow path 172 and the inflow path 132 do not communicate with each other may be maintained while the solenoid valve is initially opened (e.g., while the valve member 150 moves from the first position at which the outlet flow path 114 is blocked to the second position at which the outlet flow path 114 is opened) to the predetermined initial open section. As a result, it may be possible to prevent an abnormal operation of the valve member 150 from being caused by a rapid change in pressure in the second space S2, such that it may be possible to obtain an advantageous effect of improving accuracy of proportional control for the valve member 150.

When the plunger 140 is disposed at a predetermined height (e.g., the plunger 140 moves to a predetermined stroke), the first guide flow path 172 may be disposed to communicate with the inflow path 132. In particular, the configuration in which the first guide flow path 172 is disposed to communicate with the inflow path 132 may indicate that a part or the entirety of the first guide flow path 172 is disposed to communicate with the inflow path 132.

As an example, the first guide flow path 172 may be formed in a straight shape in a radial direction of the plunger 140 (e.g., in a horizontal direction based on FIG. 1). According to another exemplary embodiment of the present disclosure, the first guide flow path 172 may be formed in a curved shape or other shapes, and the present disclosure is not limited or restricted by the shape and the structure of the first guide flow path 172.

In particular, a plurality of first guide flow paths 172 may be spaced apart from one another in the circumferential direction of the plunger 140. As an example, the plunger 140 may be formed with four first guide flow paths 172 which are spaced apart from one another at an interval of about 90 degrees to form an approximately cross (+) shape and correspond to the inflow paths 132. A first end of the second guide flow path 174 may communicate with a first flow path 174a, and a second end of the second guide flow path 174 may be exposed to the second space S2.

The structure of the second guide flow path 174 may be variously changed based on required conditions and design specifications. As an example, the second guide flow path 174 may include the first flow path 174a configured to communicate with the first guide flow path 172 and formed in the plunger 140 in a longitudinal direction of the plunger 140, and a second flow path 174b having a first end that communicates with the first flow path 174a, and a second end that penetrates a lateral portion of the plunger 140 so as to be exposed to the second space S2.

For example, the first flow path may be formed by drilling one end of the plunger 140 and then finishing (e.g., sealing) an end of the first flow path with a finishing member (not illustrated). In some instances, other methods may be used to form the first flow path in the plunger. For reference, in the exemplary embodiment of the present disclosure, an example in which the second guide flow path 174 is formed in an "L" shape including the two flow paths (e.g., the first flow path and the second flow path) that intersect each other is described. However, according to another exemplary embodiment of the present disclosure, the second guide flow path may be formed to have only a single flow path (e.g., a straight flow path disposed to be inclined with respect to the longitudinal direction of the plunger).

As an example, the second flow path 174b may be formed in a straight shape in the radial direction of the plunger 140 (e.g., in the horizontal direction based on FIG. 1) to penetrate the lateral portion of the plunger 140. According to another exemplary embodiment of the present disclosure, the second flow path 174b may be formed in a curved shape or other shapes, and the present disclosure is not limited or restricted by the shape and the structure of the second flow path 174b.

In particular, a plurality of second flow paths 174b may be spaced apart from one another in the circumferential direction of the plunger 140. As an example, the plunger 140 may be formed with four second flow paths 174b which are spaced apart from one another at an interval of about 90 degrees to form an approximately cross (+) shape. Since the plurality of second flow paths 174b may be formed to be spaced apart from one another in the circumferential direction of the plunger 140 as described above, the fluid supplied along the first flow path 174a may be supplied into the second space S2 uniformly in the circumferential direction of the plunger 140, and as a result, it may be possible to obtain an advantageous effect of uniformly forming the pressure in the second space S2 as a whole.

Additionally, the plurality of first guide flow paths 172 may be connected in common to a first end (e.g., upper end) of the first flow path 174a, and the plurality of second flow paths 174b may be connected in common to a second end (e.g., lower end) of the first flow path 174a. Since the plurality of first guide flow paths 172 may be connected in common to the first end of the first flow path 174a and the plurality of second flow paths 174b may be connected in common to the second end of the first flow path 174a as described above, only the single first flow path 174a is needed to connect the plurality of first guide flow paths 172 and the plurality of second flow paths 174b, and as a result, it may be possible to obtain an advantageous effect of simplifying a structure and a manufacturing process. According to another exemplary embodiment of the present disclosure, the plurality of first guide flow paths 172 and the plurality of second flow paths 174b may be connected by a plurality of first flow paths 174a different from each other.

In addition, according to the exemplary embodiment of the present disclosure, the spring support part 128 may have an aperture 128a that communicates with the fluid guide part 170 (e.g., second flow path) and the second space S2. The spring support part 128 may have only one aperture 128a or a plurality of apertures 128a, and the number of apertures 128a and the structure of the aperture 128a may be variously changed based on required conditions and design specifications.

As described above, since the aperture 128a may be formed in the spring support part 128 and the fluid, which is guided to the second guide flow path 174 through the first guide flow path 172, may be supplied into the second space S2 through the aperture 128a, it may be possible to obtain an advantageous effect of minimizing a load while the outlet flow path 114 is opened (e.g., while the valve member moves to the position at which the outlet flow path is opened) It may also be possible to obtain an advantageous effect of improving efficiency in discharging the fluid.

In addition, according to the exemplary embodiment of the present disclosure, the gap G may be formed between the yoke 126 and the plunger 140. In other words, the gap G may be formed to ensure the upward and downward movements of the plunger 140 between the yoke 126 and the plunger 140. In particular, the gap G may be formed to have a smaller cross-sectional area than the fluid guide part 170 (e.g., L2<L1).

Since the gap G has a smaller cross-sectional area than the fluid guide part 170 as described above, a flow rate Q1 of the fluid flowing (leaking) through the gap G may be substantially less than a flow rate Q2 of the fluid flowing through the fluid guide part 170 (Q1<Q2), such that an instantaneous change in pressure, which is caused by the fluid leaking from the first space S1 to the second space S2 through the gap G when the solenoid valve is initially opened, may be negligibly low. Therefore, it may be possible to obtain an advantageous effect of preventing an abnormal operation of the valve member 150 from being caused by a rapid change in pressure of the second space S2 when the solenoid valve is initially opened. It may also be possible to obtain an advantageous effect of improving accuracy of proportional control.

Figure 6:
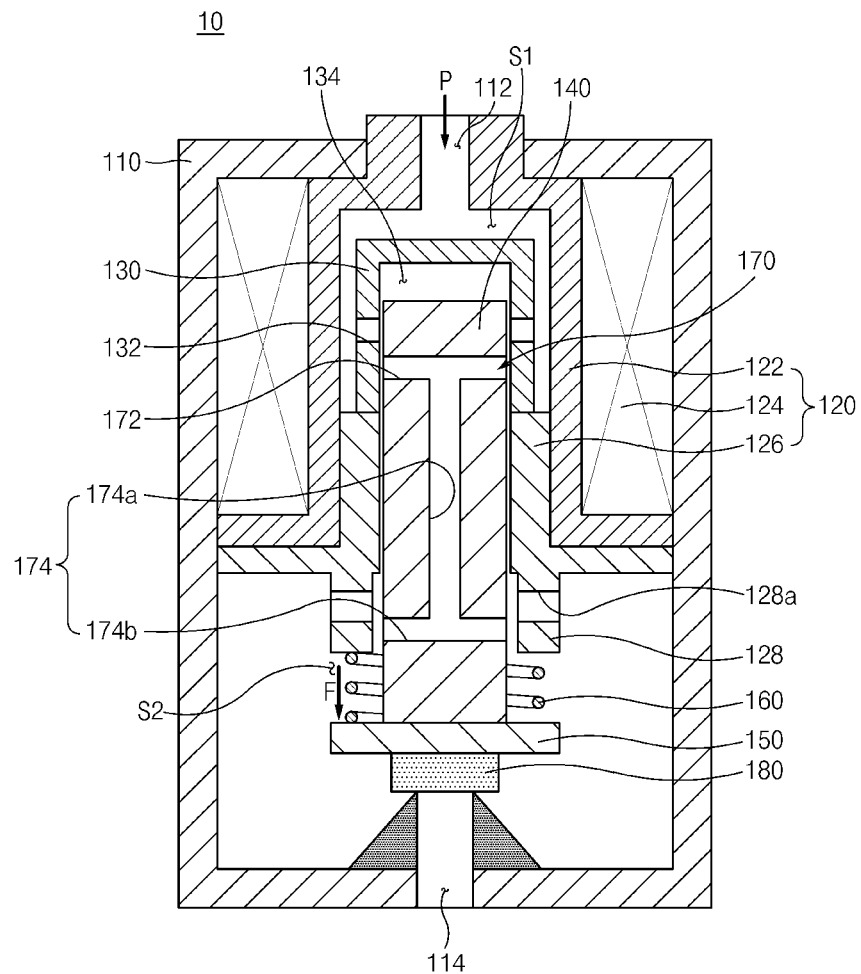
FIG. 6 is a view illustrating a blocked state of an outlet flow path of the solenoid valve according to the exemplary embodiment of the present disclosure.

Referring to FIG. 6, in a state in which the solenoid valve is closed (e.g., no power is applied to the coil 124), both elastic force F1 of the spring member 160 and a pressure P1 of the fluid supplied into the solenoid valve may be applied to the valve member 150, and as a result, it may be possible to ensure leakproof sealability made by the valve member 150 (e.g., the state in which the outlet flow path is blocked). In addition, in the state in which the solenoid valve is closed, the first guide flow path 172 may be disposed to prevent communication with the inflow path 132.

Figure 8:
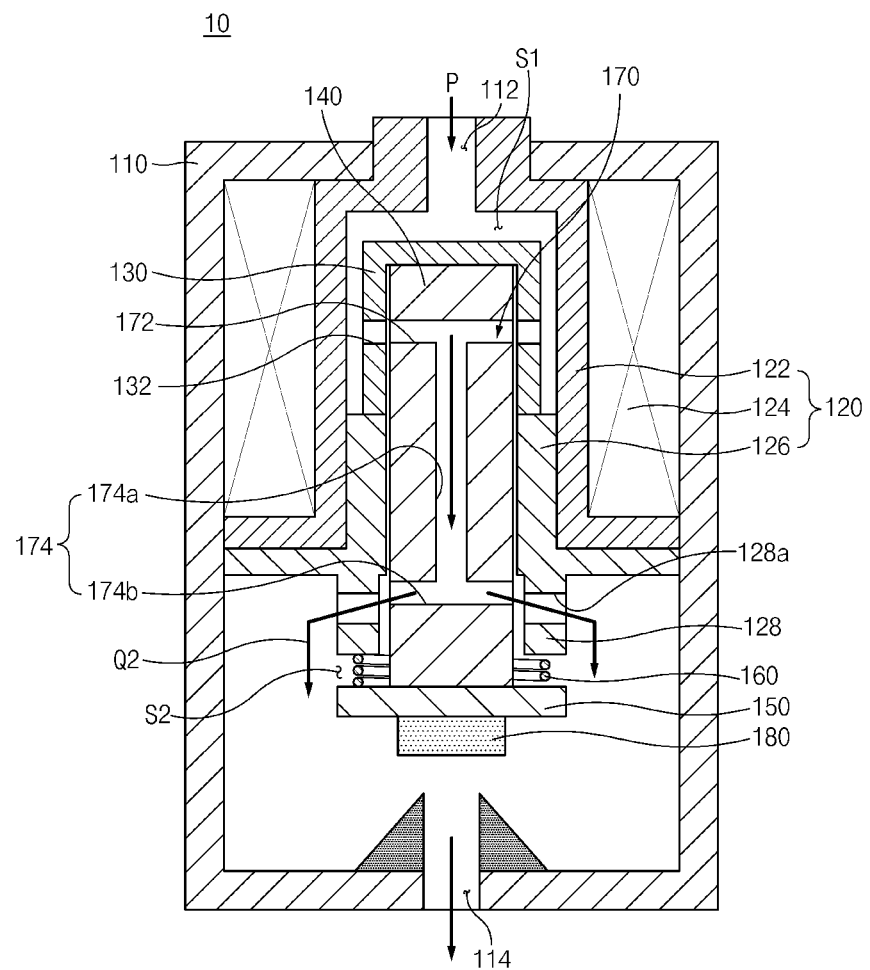
FIG. 8 is a view illustrating a maximally opened state of the outlet flow path of the solenoid valve according to the exemplary embodiment of the present disclosure.

Referring to FIGS. 7 and 8, when power is applied to the coil 124, the plunger 140 moves relative to the bobbin 122 in accordance with the value of the electric current applied to the coil 124, such that the degree to which the outlet flow path 114 is opened or closed by the valve member 150 may be adjusted. Referring to FIG. 7, the state in which the first guide flow path 172 does not communicate with the inflow path 132 may be maintained while the valve member 150 moves from the first position (see FIG. 6) at which the outlet flow path 114 is blocked to the second position (see FIG. 7) at which the outlet flow path 114 is opened to the predetermined initial open section (e.g., while the solenoid valve is initially opened), and as a result, it may be possible to prevent an abnormal operation of the valve member 150 from being caused by a rapid change in pressure in the second space S2 when the solenoid valve is initially opened.

Referring to FIG. 8, when the plunger 140 is disposed at a predetermined height (e.g., the plunger 140 moves upward to a predetermined stroke), the first guide flow path 172 may be disposed to communicate with the inflow path 132. Since the first guide flow path 172 and the inflow path 132 communicate with each other, the fluid introduced into the inflow path 132 may be guided to the second space S2 along the first guide flow path 172 and the second guide flow path 174 and discharged out of the second space S2 through the outlet flow path 114.

While the exemplary embodiments have been described above, but the exemplary embodiments are just illustrative and not intended to limit the present disclosure. It can be appreciated by those skilled in the art that various modifications and alterations, which are not described above, may be made to the present exemplary embodiment without departing from the intrinsic features of the present exemplary embodiment. For example, the respective constituent elements specifically described in the exemplary embodiments may be modified and then performed. Further, it should be interpreted that the differences related to the modifications and alterations are included in the scope of the present disclosure defined by the appended claims.

According to the exemplary embodiment of the present disclosure as described above, it is possible to obtain an advantageous effect of improving stability and reliability. In particular, according to the exemplary embodiment of the present disclosure, it may be possible to obtain an advantageous effect of ensuring leakproof sealability (blockage stability) of an on/off blocking type solenoid valve, an advantageous effect of improving accuracy of proportional control, and an advantageous effect of preventing an abnormal operation of the valve member from being caused by a rapid change in pressure when the solenoid valve is initially opened (a state in which the plunger operates at a low stroke).

What is claimed is:

1. A solenoid valve, comprising:
    a valve housing having, at a first side, a first space that communicates with an inlet flow path and having, at a second side, a second space that communicates with an outlet flow path;
    a solenoid provided in the valve housing to surround the first space;
    a flow path guide provided in the first space and having an inflow path that communicates with the first space;
    a plunger configured to be rectilinearly moved in the flow path guide by the solenoid;
    a valve member connected to the plunger and configured to open or close the outlet flow path based on a movement of the plunger;
    a spring member configured to provide elastic force to allow the valve member to move in a direction in which the valve member blocks the outlet flow path; and
    a fluid guide part formed in the plunger and configured to guide a fluid, which is supplied into the inflow path via the first space, selectively to the second space,
    wherein the fluid guide part includes:
        a first guide flow path formed in the plunger and disposed to selectively communicate with the inflow path based on the movement of the plunger,
        wherein a state in which the first guide flow path does not communicate with the inflow path is maintained while the val e member moves from a first position at which the outlet flow path is blocked to a second position at which the outlet flow opened to a predetermined initial open section.

2. The solenoid valve of claim 1, wherein the fluid guide part includes:
    a second guide flow path having a first end that communicates with the first guide flow path, and a second end that is exposed to the second space.

3. The solenoid valve of claim 1, comprising:
    a sealing member provided on the valve member and configured to come into contact with the outlet flow path.

4. The solenoid valve of claim 2, wherein the second guide flow path includes:
    a first flow path configured to communicate with the first guide flow path and formed along the interior of the plunger; and
    a second flow path having a first end that communicates with the first flow path, and a second end that is exposed to the second space.

5. The solenoid valve of claim 4, wherein the first guide flow path is provided in a plurality, and the plurality of first guide flow paths are spaced apart from one another in a circumferential direction of the plunger, the second flow path is provided in a plurality, and the plurality of second flow paths are spaced apart from one another in the circumferential direction of the plunger, the plurality of first guide flow paths are connected in common to a first end of the first flow path, and the plurality of second flow paths are connected in common to a second end of the first flow path.

6. The solenoid valve of claim 1, wherein the flow path guide has an inflow chamber, and the inflow path is formed in a sidewall portion of the flow path guide to communicate with the first space and the inflow chamber.

7. The solenoid valve of claim 6, wherein inflow path is provided in a plurality, and the plurality of inflow paths are formed to be spaced apart from one another in a circumferential direction of the flow path guide.

8. A solenoid valve, comprising:
    a valve housing having at a first side, a first space that communicates with an inlet flow path and having, at a second side, a second space that communicates with an outlet path;
    a solenoid provided in the valve housing to surround the first space;
    a flow path guide provided in the first sp and having an inflow path that communicates with the first space;
    at plunger configured to be rectilinearly moved in the flow path guide by the solenoid;
    a valve member connected to the plunger and configured to open or close the outlet flow path based on a movement of the plunger;
    a spring member configured to provide elastic force to allow the valve member to move in a direction in which the valve in member blocks the outlet flow path; and
    a fluid guide part formed in the plunger and configured to guide a fluid, which is supplied into the inflow path via the first space, selectively to the second space a bobbin provided in the valve housing to surround the plunger;

a coil wound around the bobbin; and a yoke disposed between the bobbin and the plunger.

9. The solenoid valve of claim 8, comprising:

a spring support part that extends from the yoke and configured to support the spring member.

10. The solenoid valve of claim 9, wherein the spring support part has a aperture that communicates with the fluid guide part and the second space.

11. The solenoid valve of claim 8, wherein a gap is formed between the yoke and the plunger, and the gap has a smaller cross-sectional area than the fluid guide part.

* * * * *